US009797627B2

(12) United States Patent
Liu

(10) Patent No.: US 9,797,627 B2
(45) Date of Patent: Oct. 24, 2017

(54) DISTRICT PUBLIC WATER SUPPLY PIPE NETWORK SYSTEM COMPATIBLE FOR SOURCE SIDE WATER FOR GROUND SOURCE HEAT PUMP SYSTEM AND RECLAOMED WATER

(71) Applicant: TIANJIN GERUISI NEW TECHNOLOGY OF MECHANICAL AND ELECTRICAL CO. LTD, Tianjin (CN)

(72) Inventor: Dingguo Liu, Tianjin (CN)

(73) Assignee: TIANJIN GERUISI NEW TECHNOLOGY OF MECHANICAL AND ELECTRICAL CO. LTD., Tianjin (CN)

( * ) Notice: Subject to any disclaimer, the term of this patent is extended or adjusted under 35 U.S.C. 154(b) by 316 days.

(21) Appl. No.: 14/540,327

(22) Filed: Nov. 13, 2014

(65) Prior Publication Data

US 2015/0083362 A1  Mar. 26, 2015

Related U.S. Application Data

(63) Continuation of application No. PCT/CN2013/083748, filed on Sep. 18, 2013.

(30) Foreign Application Priority Data

Sep. 21, 2012  (CN) .......................... 2012 1 0360617
Dec. 21, 2012  (CN) .......................... 2012 1 0574130
Aug. 6, 2013   (CN) .......................... 2013 1 0342126

(51) Int. Cl.
*F15D 1/00*     (2006.01)
*C02F 3/00*     (2006.01)
(Continued)

(52) U.S. Cl.
CPC ............ *F24J 3/08* (2013.01); *F24D 17/0005* (2013.01); *F24D 17/02* (2013.01);
(Continued)

(58) Field of Classification Search
CPC ......... F24J 3/08; F24D 17/0005; F24D 17/02; F24D 2200/11; F24D 2200/12;
(Continued)

(56) References Cited

U.S. PATENT DOCUMENTS 4,937,052 A * 6/1990 Takahashi ................ B01J 3/042
                                            166/300
6,068,773 A * 5/2000 Sheaffer .................... C02F 3/00
                                            210/149

(Continued)

FOREIGN PATENT DOCUMENTS

CN   101761991    6/2010
CN   201582904    9/2010
(Continued)

OTHER PUBLICATIONS

Search Report in International Application No. PCT/CN2013/083748 dated Dec. 19, 2013.

*Primary Examiner* — Justin Jonaitis
(74) *Attorney, Agent, or Firm* — IPro, PLLC; Qian Gu

(57) ABSTRACT

A district public water supply pipe network system compatible for ground source heat pump water and reclaimed water comprises a water supply main pipe connected with a reclaimed water outlet side of a sewage treatment system and connected to a plurality of energy stations and a plurality of transmission and distribution station, and a return water main pipe arranged between the adjacent energy stations to connect them. The energy stations are provided with a plurality of shallow geothermal heat exchange system for exchanging heat with shallow geothermal energy in the (Continued)

region. Both the energy stations and the transmission and distribution station are connected with corresponding distribution pipe networks connected with a user terminal water supply system. The system provides the source side water and the reclaimed water to users. It is a district public geothermal pipe network and a reclaimed water pipe network.

20 Claims, 4 Drawing Sheets

(51) Int. Cl.
| | |
|---|---|
| F24J 3/08 | (2006.01) |
| F24D 17/00 | (2006.01) |
| F24D 17/02 | (2006.01) |
| F25B 30/06 | (2006.01) |

(52) U.S. Cl.
CPC ...... F24D 2200/11 (2013.01); F24D 2200/12 (2013.01); F24D 2200/20 (2013.01); F25B 30/06 (2013.01); Y02B 10/40 (2013.01); Y02B 10/70 (2013.01); Y02B 30/52 (2013.01); Y02E 10/10 (2013.01)

(58) Field of Classification Search
CPC ..... F24D 2200/20; F25B 30/06; Y02B 10/40; Y02B 10/70; Y02B 30/52; Y02E 10/10
USPC .... 165/45, 47; 210/600, 612, 175, 919, 920; 71/11, 25
See application file for complete search history.

(56) References Cited

U.S. PATENT DOCUMENTS

| | | | |
|---|---|---|---|
| 2010/0314463 A1* | 12/2010 | Duplan | F25C 3/04 239/14.2 |
| 2011/0284088 A1* | 11/2011 | Mahony | C02F 1/00 137/1 |
| 2012/0199208 A1 | 8/2012 | Moreau et al. | |

FOREIGN PATENT DOCUMENTS

| | | |
|---|---|---|
| CN | 102410671 | 4/2012 |
| CN | 202188789 U | 4/2012 |
| CN | 202194180 U | 4/2012 |
| CN | 101818938 | 6/2012 |
| CN | 202304086 U | 7/2012 |
| CN | 103061381 | 4/2013 |
| CN | 203113425 U | 8/2013 |
| CN | 102287915 | 7/2014 |
| FR | 2960099 | 11/2011 |
| JP | 11-159891 | 6/1999 |
| JP | 2003082970 | 3/2003 |
| WO | 03012348 A3 | 5/2003 |
| WO | 2011146871 A3 | 4/2012 |

* cited by examiner

DISTRICT PUBLIC WATER SUPPLY PIPE NETWORK SYSTEM COMPATIBLE FOR SOURCE SIDE WATER FOR GROUND SOURCE HEAT PUMP SYSTEM AND RECLAOMED WATER

CLAIM OF PRIORITY AND CROSS-REFERENCE TO RELATED APPLICATION(S)

This application is a continuation of International Application No. PCT/CN2013/083748, filed Sep. 18, 2013 (published as WO2014/044186A1). The International Application claims priority to Chinese Patent Application No. 201210360617.5, filed on Sep. 21, 2012, Chinese Patent Application No. 201210574130.7, filed on Dec. 21, 2012 and Chinese Patent Application No. 201310342126.2, filed on Aug. 6, 2013. The afore-mentioned patent applications are hereby incorporated by reference in their entireties.

BACKGROUND OF THE INVENTION

1. Field of the Invention

The present disclosure relates to district public water supply pipe network system, and more particularly, to water supply pipe network system compatible for source side water for ground source heat pumping system and reclaimed water, which not only provides the ground source heat pumping system in the district with source side water as cooling/heating source, but provides the user in the district with reclaimed water, combining two networks together so that providing one network with dual functions.

2. Description of the Related Art

Energy resource, water resource and environment is perennial subjects of interest concern with the survival and development of human being. It is major challenges which the entire human race should face that how to conserve of energy and water and to protect the environment. For the purpose of energy conservation, water conservation and environmental conservation, various ground source heat pump technology and reclaimed water using technology are developed in the field in recent years. Ground source heat pump technology is an energy saving, environmentally friendly HVAC (Heat Ventilation and Air-Conditioning) technology, which utilizes energy stored in shallow geothermal energy resources in the earth surface such as rock soil mass, underground water, surface water, e.g. river, lake, sea etc., municipal sewage and waste water for cooling or heating. Because the shallow geothermal energy system in the earth surface has stable temperature all the year around, which makes the shallow geothermal energy system a benefiting cooling/heat source for water source heat pump units so that the water source heat pump unit could run in best operation condition, the COP (Coefficient of Performance) of ground-source heat pump is 30% higher than that of traditional air-conditioning. In addition, the ground-source heat pump does not discharge any pollutants to the environment, therefore, it is energy-saving and environmentally friendly. The shallow geothermal energy resource in the earth surface has extensive sources and is recyclable and inexhaustible, and it is known as a clean and renewable energy source which has attracted a wide range of attention and achieved rapid development. In accordance with heat sources and arrangements, the ground-source heat pump system may be classified as follows:

Ground coupled heat pump system: Vertical ground coupled heat pump system Horizontal ground coupled heat pump system Ground water heat pump system: Direct ground water heat pump system Indirect ground water heat pump system Surface water source heat pump system Open loop surface water source heat pump system Closed loop submersible pipe surface water source heat pump system Closed loop Intermediate heat exchange surface water source heat pump system Sewage source heat pump system Direct sewage source heat pump system, i.e. untreated sewage source heat pump system Indirect sewage source heat pump system Reclaimed water source heat pump system At present, ground-source heat pump is constructed as individual project, i.e. in accordance with the available resource, environment and execution conditions of individual buildings, specific type of ground source heat pump system is constructed, and operate individually. There are a lot of disadvantages for individual project development mode, which puts brake on development of the ground source heat pump technology.

At the same time, waste water treatment and reclaimed water utilization are effective way to deal with increasingly shortage of water resources. Reclaimed water is non-potable water which is obtained by deeply treating sewage and meets predetermined criterion and may be used within limits. According to statistics, 80% volume of urban water consumption is converted into sewage, 70% volume of which could be converted into reclaimed water after deeply treatment. This means that over 50% volume of urban water consumption may be converted into reclaimed water. Therefore, the reclaimed water resource is a water source with large volume, low cost and distribution convenience for urban area. In addition, it facilitates the development of urban sewage treatment and reduces the pollution of urban sewage. Sewage treatment and utilization of reclaimed water is economic and environmentally friendly. However, at present, the utilization of reclaimed water is unsatisfactory. The main reason is that the reclamation rate of the reclaimed water is low and the application area is not extensive. Therefore, on the one hand, the urban area has severe water shortages, which endangers people's health and daily life and affects the sustainable development of society and economy; on the other hand, if reclaimed water cannot be utilized, a lot of precious water resources would be wasting away.

Currently, the existing ground source heat pump technology and reclaimed water utilization technology mainly face the following defects:

The defects of existing ground source heat pump technology are as follows:

The construction mode of individual project restricts the large scale promotion of the ground source heat pump. For a construction project, whether to adopt a ground source heat pump system depends on its environment, resources conditions, hydrogeologic conditions, construction conditions, etc., which are great constraints for individual project making a lot of construction projects cannot adopt source heat pump system.

It is difficult to achieve energy balance. Energy balance is a principle which the development of ground source heat pump construction should follow. When a system discharges quantity of heat to the underground, the heat taken back from the underground should be fundamental equilibrium. Otherwise, if a district is kept in an energy imbalance state for a long time, its temperature field will be damaged, so that the rock and earth mass will be formed the "heat island" or "cold island", or the quality of the surface water will be deteriorated and the environmental pollution will be formed, or the water temperature, water quality, water flow of the underground water will be damaged, or even the geological disasters will be made, etc. The existing individual ground source heat pump systems usually tend to adopt single kind of geothermal resource, which is difficult to achieve energy balance.

It is difficult to guarantee the quality of the cooling/heat source. The temperature of the cold/heat source is the key element to the energy-saving and efficient operation of the water source heat pump units. Generally, to maintain the water source heat pump units under the best working conditions, the temperature of the source side inflow water should be: about 25° C. for summer and 10 to 15° C. for winter. The temperature, beyond this range, whether too high or too low is not desirable. It will cause drop in efficiency, and rise in energy consumption in less severe cases; or even worse, it will cause the units break down and be out of service, or cause the unit shut down, the system break down, and the project fail. The development mode of individual project tends to adopt single form of geothermal resource, which usually has the nature of limitations and instability, and cannot fully guarantee the quality of the cooling/heat source, cannot guarantee the energy saving effect of ground source heat pump system, and cannot guarantee the sustained and stable operation of ground source heat pump system.

It is difficult to guarantee the quality of construction by the way of individual project. Ground source heat pump system is a complicated system, its development and construction must attach great importance to the science and technology, and implement strict construction norms and standards. However, individual project is often short of rigorous management, and its construction often does not conform standards, so that the construction quality is difficult to guarantee with lots of hidden troubles, which seriously influence the development of ground source heat pump technology.

Only limited development of shallow geothermal energy resources within certain district can be achieved. By the development mode of individual project, only limited development can be achieved within in a limited district by a few qualified building, and a lot of shallow geothermal energy resources within the district cannot be used.

The defects of the existing reclaimed water technology are as follows:

Cognitive mistake. It is believed that the reclaimed water is from sewage and not clean, and the quality of reclaimed water is poor. This makes people are lack of usage initiative.

The price. Currently, due to the technical and scale problem, the production and transportation cost of the reclaimed water is relatively high. The price difference between the reclaimed water and tap water is not obvious, therefore people are lack of profit-driven in the production and usage of reclaimed water.

Lack of water supply network, which causes the water cannot be supplied and becomes the bottleneck of the reclaimed water utilization.

The energy in the reclaimed water is cooling/heating source of high quality for water source heat pump units. It is common mistake that the reclaimed water can only be used as non-potable water with the energy in the water wasted.

BRIEF DESCRIPTION OF THE INVENTION

As to the defects of the prior art, after a lot of scientific research, the present invention proposed a technical solution by using the special nature of the reclaimed water as both water resources and energy, which fully solved the problems in the use of reclaimed water and in the construction development of ground source heat pump. Based on the above research results, it is provided a district public water supply pipe network system compatible for source side water of ground source heat pump system and reclaimed water, which can be used both as cold/heat source of any water source heat pump units within certain district and as reclaimed water source of any user within certain region. In other words, this network is not only the district side water pipe network with water source heat pump system, but also the reclaimed water pipe network, joining two networks together, realizing one network dual purposes.

In order to achieve the above-mentioned objective, the subject matter of the present invention is as follows:

A district public water supply pipe network system compatible for source side water for ground source heat pump system and reclaimed water, comprises (a) a water supply main pipe connected with the reclaimed water outlet of a sewage treatment system, (b) a plurality of energy stations and transmission and distribution stations which are connected with the water supply main pipe, (c) a water return main pipe which is arranged between adjacent energy stations, and (d) distribution pipe networks which are connected with the corresponding energy stations or the transmission and distribution stations respectively. The energy station comprises a plurality of shallow geothermal energy exchange systems (also known as "ground heat exchangers") which exchange heat with district shallow geothermal energy sources. The outlet at the distribution side of the energy station is connected with the water supply pipeline of the corresponding distribution pipe network through a distribution water pump and a water supply distribution pipe of the distribution pipe network; the energy station is connected with the return pipeline of corresponding distribution pipe network by a water return distribution pipe of the distribution pipe network.

The energy station may further comprise a distribution pool which is connected with the water supply main pipe and the outlet at the distribution side of which is connected with the water supply distribution pipe of corresponding distribution pipe network through a distribution water pump of the energy station, and a collection pool with inlets which are connected with the water return pipeline of corresponding distribution pipe network and outlets which is connected with inlets of a reclaimed water treatment systems through pipeline.

The reclaimed water treatment system is configured to have one or more outlets which are correspondingly connected with one or two types of shallow geothermal energy exchange systems through circulating water pumps.

When connected with a closed loop shallow geothermal energy exchange system, the outlet of the reclaimed water treatment system is connected with the inlet of the closed loop shallow geothermal energy exchange system corresponding to the energy station through the circulating water pump, and the outlet of the closed loop shallow geothermal energy exchange system is connected with the inlet of the distribution pool through pipelines.

When connected with an open loop shallow geothermal energy exchange system, the outlet of the reclaimed water treatment system is connected with the inlet of the open loop shallow geothermal energy exchange system corresponding to the energy station through the circulating water pump, and the outlet of the open loop shallow geothermal energy exchange system is connected with the inlet of the distribution pool through pipelines and a reclaimed water retreatment system installed thereon.

The inlet of the water supply main pipe is connected with a water supply pump for water supply main pipe in the reclaimed water outlet of the sewage treatment system. The outlet of the water supply main pipe is connected with an inlet of the distribution pool for water supply main pipe in a first energy station. A water supply pump for water supply main pipe which is mounted at the outlet of the distribution pool for water supply main pipe in the first energy station is connected with the inlet of the next section of water supply main pipe, the outlet of the next section of water supply main pipe is connected with the inlet of the distribution pool in a second energy station, and a water supply pump for the water supply main pipe which is mounted at the outlet of the distribution pool in the second energy station is connected with the inlet of the next section of the water supply main pipe, and so on until the last energy station.

The water return main pipe is arranged between collection pools of two adjacent energy stations. A return connector of one of the two adjacent energy station collection pools is connected with a head port of the water return main pipe through a return water pump for water return main pipe and a control valve for water return main pipe in sequence. A tail port of the water return main pipe is connected with a first return connector of the collection pool of next energy station through a control valve for water return main pipe and a return water pump for water return main pipe, a second source side water return connector of the energy station collection pool is connected with the head port of the next section of the water return main pipe for source side water through a return water pump for water return main pipe and a control valve for water return main pipe for source side water in sequence, and so on until the last energy station, wherein, the head port and tail port of each water return main pipe are connected with corresponding collection pool respectively by bypass valves and bypass pipe.

The transmission and distribution station may comprise a control valve, an inlet pipe which is connected with the water supply main pipe through the control valve, a distribution water pump, and a distribution pool, the inlet of which is connected with an outlet of the inlet pipe, and the outlet at the distribution side of which is connected with the corresponding distribution pipe network through the distribution water pump.

The distribution pipe network may comprise a water supply distribution pipe which is configured to connect the outlet at the distribution side of the distribution pool of the energy station or the transmission and distribution station and water supply branch pipes of corresponding distribution pipe network, a distribution water pump which is installed on the water supply distribution pipe, a water return distribution pipe which is configured to connect the inlet of the collection pool of the energy station and corresponding water return branch pipe when the distribution pipe network is connected with an energy station, and to be connected with the water return pipeline of another distribution pipe network corresponding to an energy station adjacent to the distribution pipe network when the distribution pipe network is connected with a transmission and distribution station, water supply branch pipes which are connected with at least one user side water supply system, and water return branch pipes which are connected with at least one user side water supply system.

The distribution pipe network adopts hybrid pipe network with both ring-shape network and branched network; the water return branch pipes get the source side water return by means of gravity return, pressure return or the combination of both. When the water return branch pipes get the source side water return by means of pressure return, a booster pump may be installed on the water return pipeline.

The district public water supply pipe network system may further comprises sub-district pipe networks which are connected with the distribution networks corresponding to energy stations or transmission and distribution stations. The sub-district pipe network includes a water supply main pipe of sub-district pipe network which is connected with the water supply branch pipe of the distribution network, a plurality of energy stations of sub-district pipe network and sub-district transmission and distribution stations which are connected with the water supply main pipe, water return main pipes of sub-district pipe network which are installed to connect the collection pools of adjacent energy stations of sub-district pipe network, sub-district distribution pipe networks which are connected with the corresponding energy stations or the transmission and distribution stations of sub-district pipe network respectively, and at least one user side water supply system which is connected with the sub-district distribution pipe network.

Return water pumps, control valves, bypass pipes, bypass valves for water return main pipe may be arranged at both the head port and tail port of the water return main pipes of the sub-district pipe network; the outlet of the collection pool is connected with an inlet of a reclaimed water treatment system of sub-district pipe network through pipeline; the reclaimed water treatment system which is configured to have one or more outlets which are correspondingly connected with one or two types of shallow geothermal energy exchange systems.

When connected with a closed loop shallow geothermal energy exchange system, the outlet of the reclaimed water treatment system is connected with the inlet of the closed loop shallow geothermal energy exchange system corresponding to the energy station through the circulating water pump; the outlet of the closed loop shallow geothermal energy exchange system is connected with the inlet of the distribution pool through pipelines. When connected with an open loop shallow geothermal energy exchange system, the outlet of the reclaimed water treatment system is connected with the inlet of the open loop shallow geothermal energy exchange system corresponding to the energy station through the circulating water pump; the outlet of the open loop shallow geothermal energy exchange system is connected with the inlet of the distribution pool through pipelines and a reclaimed water retreatment system installed thereon.

The sub-district transmission and distribution station comprises a control valve, an inlet pipe which is connected with the water supply main pipe of sub-district pipe network through the control valve, a distribution water pump, and a distribution pool, the outlet at the distribution side of which is connected with corresponding sub-district distribution pipe network through the distribution water pump.

The sub-district distribution pipe network comprises distribution water pumps and water supply distribution pipes of sub-district distribution pipe network which is configured to connect an outlet at the distribution side of the distribution pool of energy station of sub-district pipe network or sub-district transmission and distribution stations and a water supply branch pipe of the corresponding sub-district distribution pipe network, a water return distribution pipe of sub-district distribution pipe network which is configured to connect the inlet of the collection pool of the energy station of sub-district pipe network and corresponding water return branch pipe when the sub-district distribution pipe network is connected with an energy station of sub-district pipe network, and to be connected with the water return pipeline of another distribution pipe network corresponding to an energy station adjacent to the distribution pipe network when the distribution pipe network is connected with a transmission and distribution station, water supply branch pipes which are connected with at least one user side water supply system, and water return branch pipes which are connected with at least one user side water supply system.

The sub-district distribution pipe network adopts hybrid pipe network with both ring-shape network and branched network; the water return branch pipes get the source side water return by means of gravity return, pressure return or the combination of both.

When the water return branch pipes get the source side water return by means of pressure return, a booster pump may be installed on the water return pipeline.

The shallow geothermal energy exchange system which exchanges heat with the district shallow geothermal energy sources may be any one of the following: a ground-coupled heat exchange system, a ground water source heat exchange system, a surface water source heat exchange system, and a water source heat exchange system. The district shallow geothermal exchange may also adopt a renewable energy source heat exchange system, an unused energy source heat exchange system, or a residual source heat exchange system.

A plurality of energy stations, energy stations of the sub-district pipe network, transmission and distribution stations, and sub-district transmission and distribution stations are connected with each other and extend in a hybrid topology structure of the combination of tree topology, star topology and bus topology, so that the district public water supply pipe network system compatible for source side water of ground source heat pump system and reclaimed water could be constructed.

The user side water supply system may include the water supply branch pipe and water return branch pipe of distribution pipe network of the district public water supply pipe network system compatible for the source side water for ground source heat pump system and reclaimed water, and first user side water supply systems with a centralized ground source heat pump HVAC system, second user side water supply systems with distributed ground source heat pump HVAC systems, and third user side water supply system supplying the reclaimed water only are respectively installed on the water supply branch pipe and the water return branch pipe.

Each of the water supply branch pipe is respectively connected with a first water supply sub-branch pipe of the first user side water supply system through a first water supply port which supplies the source side water and reclaimed water to the first user side water supply system, with a second water supply sub-branch pipe of the second user side water supply system through a second water supply port which supplies the source side water and reclaimed water to the second user side water supply system, with a third water supply sub-branch pipe of the third user side water supply system through a third water supply port which supplies the source side water and reclaimed water to the second user side water supply system; the water return branch pipe is connected with a fourth water supply pipe in the third user side water supply system through a fourth water supply port providing the source side water back from thermal cycle.

On the water return branch pipe, a first return port is connected with a first water return sub-branch pipe of the first user side water supply system, and a second return port is connected with a second source side water return pipe of the second user side water supply system are installed.

The first user side water supply system may include a first booster water supply pump connected with the first water supply sub-branch pipe, the outlet of which is respectively connected with a first source side water inlet sub-branch pipe and a first reclaimed water sub-branch pipe; the outlet of the first source side water inlet sub-branch pipe is connected with the inlet of the centralized ground source heat pump units; the outlet of the centralized ground source heat pump units is connected with the inlet of a first reclaimed water treatment equipment; the outlet of the first reclaimed water treatment equipment is connected with the first inlet of a first reclaimed water tank through a first source side outlet water pump.

The return port of the first reclaimed water tank is connected with the water return branch pipe through a first water return sub-branch pipe and a first source side water return element installed thereon; the first source side water return element comprises a first gravity return pipe and a first pressure return pipe, which are parallel to each other and both connected with the first source side water return pipe; the terminal outlet of the first water return sub-branch pipe is connected with the first return port of the water return branch pipe; wherein, a fourth control valve is installed on the first gravity return pipe; a fifth control valve, a first return water pump and a first return check valve are installed on the first pressure return pipe in sequence along the flow direction.

The outlet of the first reclaimed water sub-branch pipe is connected with a second inlet e of the first reclaimed water tank; an outlet of the first reclaimed water tank is connected with a first reclaimed water supply element through a first reclaimed water distribution pipe and a first reclaimed water pump installed thereon; the first reclaimed water supply element comprises one or more outlet on the first reclaimed water distribution pipe and sub-branch pipes for first reclaimed water user terminal connected with each outlet on the first reclaimed water distribution pipe; one or more first reclaimed water user terminal is installed on the reclaimed water branch pipes for first user side water supply system.

A first control valve is installed on the first source side water inlet sub-branch pipe; a second control valve is installed on the first reclaimed water sub-branch pipe; a third control valve is installed on the pipeline connecting a first source side water outlet pump and the first reclaimed water tank.

The second user side water supply system may include a second booster water supply pump connected with the second water supply sub-branch pipe, the outlet of which is respectively connected with a second source side water inlet sub-branch pipe and a second reclaimed water sub-branch pipe. There is at least one outlet on the second source side water inlet sub-branch pipe. Each outlet is connected with a source side water inlet pipe. The source side water inlet pipe is connected with at least one inlet of the distributed water source heat pump units. The outlet of the distributed water source heat pump units is connected with the inlet of the corresponding source side water outlet pipe. The outlet of the source side water outlet pipe is connected with the inlet of the source side water outlet header pipe. The outlet of the source side water outlet header pipe is connected with the inlet of a second reclaimed water treatment equipment. The outlet of the second reclaimed water treatment equipment is connected with the first inlet of a second reclaimed water tank through a second source side water outlet pump.

The return port of the second reclaimed water tank is connected with the water return branch pipe through a second water return sub-branch pipe and a second source side water return element installed thereon. The second source side water return element comprises a second gravity return pipe and a second pressure return pipe, which are parallel to each other and both connected with the second water return sub-branch pipe. The terminal outlet of the second water return sub-branch pipe is connected with the second return port of the water return branch pipe. A tenth control valve is installed on the second gravity return pipe. An eleventh control valve, a second return water pump, and a second return check valve are installed on the second source side water pressure return pipe in sequence along the flow direction.

The outlet of the second reclaimed water sub-branch pipe is connected with a second inlet of the second reclaimed water tank; the outlet of the second reclaimed water tank is connected with a second reclaimed water supply element through a second reclaimed water distribution pipe and a second reclaimed water pump installed thereon. The second reclaimed water supply element comprises one or more outlets on the second reclaimed water distribution pipe and reclaimed water branch pipes for second user side water supply system respectively connected with each outlet of the second reclaimed water distribution pipe. One or more second reclaimed water user terminal is installed on the reclaimed water branch pipe for second user side water supply system.

A sixth control valve is installed on the second source side water inlet sub-branch pipe. A seventh control valve is installed on the second reclaimed water sub-branch pipe. An eighth control valve is installed on the pipeline connecting a second source side water outlet pump and the second reclaimed water tank; the outlet of the source side water outlet header pipe is connected with the inlet of the second reclaimed water treatment equipment through a ninth control valve.

The third user side water supply system comprises a third water supply sub-branch pipe and a twelfth control valve installed thereon, and a fourth water supply sub-branch pipe and a thirteenth control valve installed thereon. The outlets of the third water supply sub-branch pipe and that of the fourth water supply sub-branch pipe are connected with a third reclaimed water supply element together through a third reclaimed water distribution pipe and a third reclaimed water pump installed thereon.

The third reclaimed water supply element comprises one or more outlets on the third reclaimed water distribution pipe and reclaimed water branch pipe for third user side water supply system respectively connected with each outlet of the third reclaimed water distribution pipe. At least one third reclaimed water user terminal is installed on the reclaimed water branch pipe for third user side water supply system.

In the present invention, the term at least one indicates a scope including both one and more than one.

Through the technical improvement, the present invention has made the following technical improvements:

In the system of the present invention, the transmission medium within the pipe network (source side water and reclaimed water) is not only the water source of the non-potable water within certain region, but also the cold/heat source of ground heat pump system within certain region. It is both a kind of water resource and a kind of energy. The subject matter provided in the present invention combines and integrates the two natures scientifically, which achieves the energy cascade utilization and scientific utilization.

Under the technical solution of the present invention, it only need to build two pipelines, as one pipe network, realizing one network dual purposes. The source side water and reclaimed water pipe network is not only the city functional facilities, but also the city water supply facilities and city energy facilities. It greatly reduces the investment cost, operational cost and management cost of the construction, and accordingly provides broad space for the development of ground source heat pump technology and reclaimed water utilization.

The technical solution provided in the present invention is pollution-free industry solution, which could greatly promote the development of the urban sewage treatment and reclaimed water utilization, as well as the development of shallow geothermal energy exploitation and ground source heat pump technology. It could provide strong technical support and industry support for the construction of water-saving city and low-carbon city, and could create huge benefits in energy-saving, water-saving, environmental protection, economics and society.

Compared with the prior art, the district public water supply pipe network system compatible for source side water for ground source heat pump system and reclaimed water provided in the present invention, has the following features:

It could greatly promote the development of ground source heat pump technology. The subject matter provided in the present invention combines and integrates various forms of district shallow geothermal energy resources, and builds up a public pipe network and public energy field. The pipe network, as extended everywhere within certain region, could provide cooling/heat source for any user's water source heat pump units within certain region. In addition, It is of the feature of easy installation and convenient use, without complex ground source construction. After construction, with low maintenance cost, it requires no multifarious specialized ground source system operating management of the owner. It greatly reduces the initial investment. The technical solution provided in the present invention, could make the ground source heat pump technology obtain large scale promotion, and become the mainstream technology and products in the future development of HVAC industry.

The public pipe network provided in the present invention, could make the unified distribution, optimized complementation and comprehensive balance of all forms of shallow geothermal energy resources within certain large scale region, and could ultimately achieves basic energy balance within the whole region, which could effectively protect the shallow geothermal resources and maintain sustainable development, recycling, and virtuous development.

The present invention combines and integrates all forms of district shallow geothermal energy resources. Within certain large scale region, it makes optimized complementation and distribution in the energy field of various energy grade collections, and combines and integrates them into one high quality cold/heat source, which makes sure the water source heat pump units are always running under the best working conditions and achieves the effects of energy-saving and high efficiency.

It benefits the assurance of the construction quality. The district public water supply pipe network provided in the present invention, is the foundation of the city facilities. Therefore, on the construction, it could concentrate technical force of various subjects and fields, as well as multi-faced funds, and conduct strict construction management. If the serious investigation, scientific planning, optimized design, standard construction and orderly development are achieved, the construction quality could be easily assured. Accordingly, it could guarantee the stable, continuous and healthy development of the ground source heat pump technology.

It could maximize the development and utilization of the district shallow geothermal energy resources. The district public water supply pipe network provided in the present invention is the urban infrastructure, which could, according to the geographical conditions of the city, the shallow geothermal resources situations and development planning of the city, make unified, integrated and scientific planning of the construction of public pipe network of side water with ground source heat pump system and reclaimed water, by which means it could maximize and make the most of the development and utilization of shallow geothermal energy resources within certain region, and could combine and integrate the district renewable energy, unused energy, and waste heat of the traditional energy. This kind of breadth and depth of the development and utilization is unmatched by the development mode of individual project.

The present invention has broken the traditional boundaries between the two fields system of the reclaimed water and ground source heat pump, and realized the scientific combination cross technical fields, industry domain and engineering system, joining together of two networks, realizing one network dual purposes.

Figure 1:
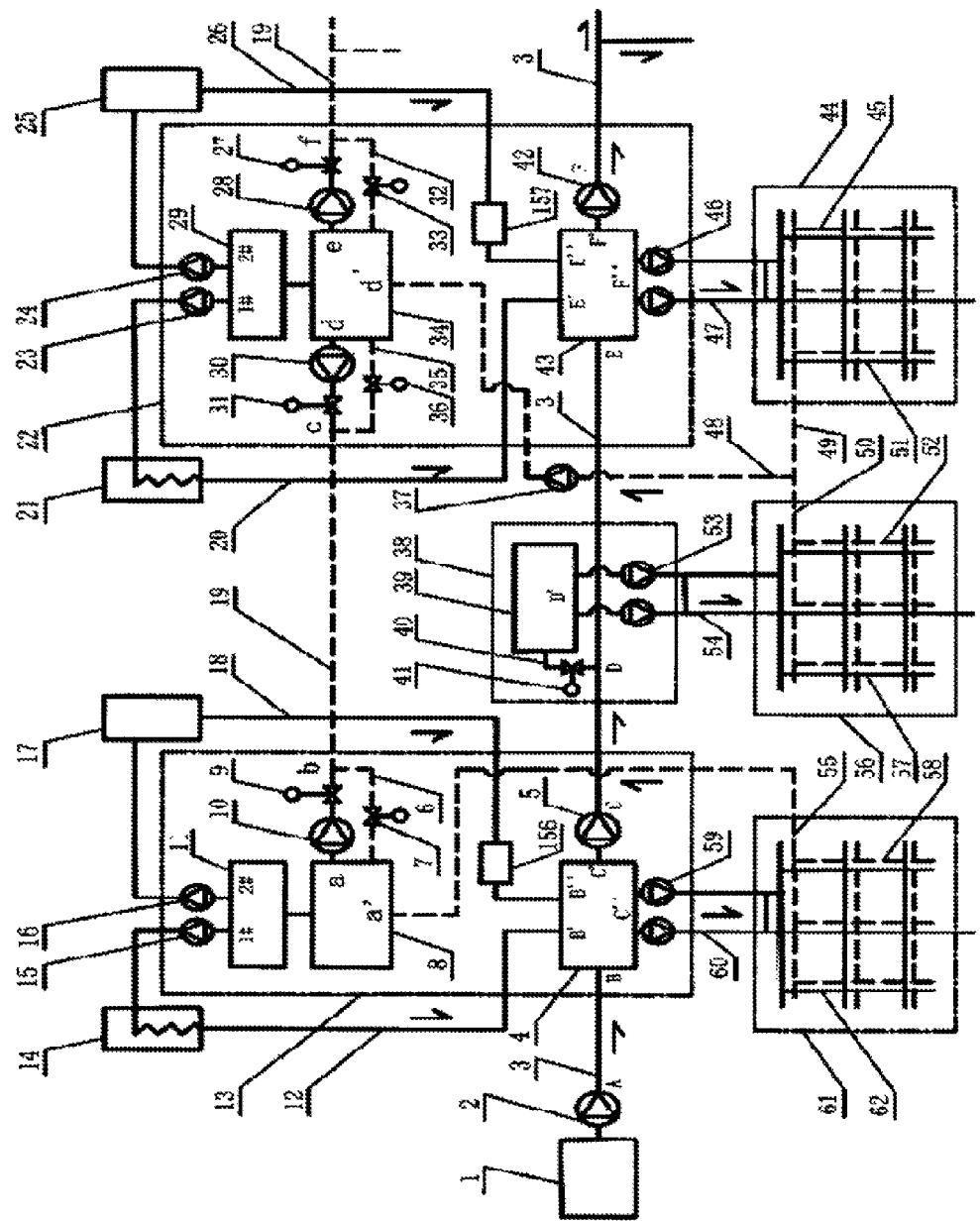
FIG. 1 is a diagram of the primary system of the first embodiment of the compatible pipe network system of the present invention.

In the drawings of the present invention, the numbers references indicate as follows:

1: sewage treatment system (reclaimed water part); 2, 5, 42: water supply pump for water supply main pipe; 3: water supply main pipe; 4, 43: distribution pool of energy station; 6, 32, 35: bypass pipe for water return main pipe; 7, 36, 33: bypass control valve for water return main pipe; 8, 34: energy station collection pool; 9, 31, 27: control valve for water return main pipe; 10, 30, 28: return water pump for water return main pipe; 11, 29: reclaimed water treatment system; 12, 18, 20, 26: outlet pipe of shallow geothermal energy exchange system; 13, 22: energy station; 14, 21: closed loop shallow geothermal energy exchange system; 15, 16, 23, 24: circulating water pump for heat exchange system; 17, 25: open loop shallow geothermal energy exchange system; 19: water return main pipe; 37: booster pump for water return pipeline; 38: transmission and distribution station; 39: distribution pool of transmission and distribution station; 40: inlet pipe of transmission and distribution station; 41: control valve of transmission and distribution station; 44, 56, 61: distribution pipe network; 45, 58, 52: water return branch pipe of distribution pipe network; 46, 53, 59: distribution water pump; 47, 54, 60: water supply distribution pipe of distribution pipe network; 48, 49, 50, 55: water return distribution pipe of distribution pipe network; 51, 57, 62: water supply branch pipe of distribution pipe network;

63, 77, 84: water supply distribution pipe of sub-district distribution pipe network; 64, 78, 85: water supply pump of sub-district distribution pipe network; 65, 121, 127: water supply main pipe of sub-district pipe network; 66, 74, 81, 123, 125: sub-district distribution pipe network; 67, 75, 82: water supply branch pipe of sub-district distribution pipe network; 68, 76, 83: water return branch pipe of sub-district distribution pipe network; 69, 70, 86: water return distribution pipe of sub-district distribution pipe network; 71, 87: distribution pool of energy station of sub-district pipe network; 72: control valve of sub-district transmission and distribution station; 73: inlet pipe of sub-district transmission and distribution station; 79: distribution pool of sub-district transmission and distribution station; 80, 126: sub-district transmission and distribution station; 88, 114: water supply pump for water supply main pipe of sub-district pipe network; 89, 101, 107: return water pump for water return main pipe of sub-district pipe network; 90, 102, 108: control valve for water return main pipe of sub-district pipe network; 91, 122: water return main pipe of sub-district pipe network; 92, 104, 109: bypass pipe for water return main pipe of sub-district pipe network; 93, 100, 110: bypass valve for water return main pipe of sub-district pipe network; 94, 111: collection pool of energy station of sub-district pipe network; 95, 103, 112, 120: outlet pipe of shallow geothermal energy exchange system of sub-district pipe network; 96, 99, 113, 117: circulating water pump of shallow geothermal energy exchange system of sub-district pipe network; 97, 116: open loop shallow geothermal energy exchange system of sub-district pipe network; 98, 115: reclaimed water treatment equipment of sub-district pipe network; 105, 118, 124: energy station of sub-district pipe network; 106, 119: closed loop shallow geothermal energy exchange system of sub-district pipe network;

128a: first water supply sub-branch pipe for source side water and reclaimed water; 128b: second water supply sub-branch pipe for source side water and reclaimed water; 128c: third water supply sub-branch pipe for source side water and reclaimed water; 129a: first source side water return sub-branch pipe; 129a-1: first gravity return pipe; 129a-2: first pressure return pipe; 129b: second source side water return sub-branch pipe; 129b-1: second gravity return pipe; 129b_2: second pressure return pipe;

130a: first booster water supply pump; 130b: second booster water supply pump; 131a: first control valve; 131b: sixth control valve; 132: centralized water source heat pump units; 133a: first reclaimed water treatment equipment; 133b: second reclaimed water treatment equipment; 134a: fourth control valve; 134b: tenth control valve; 135a: first source side water inlet sub-branch pipe; 135b: second source side water inlet sub-branch pipe; 136a: first source side water outlet pump; 136b: second source side water outlet pump; 137a: third control valve; 137b: eighth control valve; 138a: first reclaimed water sub-branch pipe; 138b: second reclaimed water sub-branch pipe; 139a: second control valve; 139b: seventh control valve;

140a: first reclaimed water tank; 140b: second reclaimed water tank; 141a: first reclaimed water pump; 141b: second reclaimed water pump; 141c: third reclaimed water pump; 142a: first reclaimed water distribution pipe; 142b: second reclaimed water distribution pipe; 142c: third reclaimed water distribution pipe; 143a: first reclaimed water user terminal; 143b: second reclaimed water user terminal; 143c: third reclaimed water user terminal; 144a: reclaimed water branch pipe for first user side water supply system; 144b: reclaimed water branch pipe for second user side water supply system; 144c: reclaimed water branch pipe for third user side water supply system; 145*a*: first return check valve; 145*b*: second return check valve; 146*a*: first return water pump; 146*b*: second return water pump; 147*a*: fifth control valve; 147*b*: eleventh control valve; 148: source side water outlet pipe; 149: distributed water source heat pump units; 150: source side water inlet pipe; 151: source side water outlet header pipe; 152: ninth control valve; 153: twelfth control valve; 154: thirteenth control valve 155: fourth water supply sub-branch pipe;

156, 157, 158, 159: reclaimed water retreatment system.

DETAILED DESCRIPTION OF EMBODIMENTS OF THE INVENTION

The district water supply pipe network compatible for the source side water of ground source heat pump system and reclaimed water according to the present invention will be described in detail hereunder with reference to the embodiments and accompanying drawings. The following embodiments are just some preferred implementations according to the present invention, however, it does not intended to limit the invention to these embodiments.

As shown in FIG. 1, the primary system of the district water supply pipe network compatible for the source side water for ground source heat pump system and reclaimed water according to the present invention, comprises a water supply main pipe 3 connected with the outlet of the sewage treatment system, which is the transportation medium in the pipe network, i.e. the main pipeline for transporting both the source side water and reclaimed water and is configured to transport the source side water and reclaimed water to each energy station and each transmission and distribution station. A plurality of energy stations 13/22 and transmission and distribution stations 38 are connected with water supply main pipe 3, and a water return main pipe 19 is arranged between the adjacent energy stations 13/22 to communicate them, and each energy station 13/22 is provided with a plurality of shallow geothermal energy exchange systems 14/21, 17/25 exchanging heat with shallow geothermal energy source in the region. Each energy station 13/22 or each transmission and distribution stations 38 is connect with a corresponding distribution pipe network 61/44/56, each of which is connected with one or more user side water supply systems.

Energy station 13/22 comprises a distribution pool 4/43, a collection pool 8/34 and a reclaimed water treatment system 11/29. Wherein, distribution pool 4/43 is connected with water supply main pipe 3, from which distribution pool 4/43 receives both the source side water and reclaimed water. Outlet C"/F" at the distribution side of the energy station is connected with water supply distribution pipe 60/47 in corresponding distribution pipe network 61/44 by a distribution water pump 59/46 of energy station. Inlet a'/d' of collection pool 8/34 is connected with water return distribution pipe 55/48, and the outlet of collection pool 8/34 is connected with the inlet of reclaimed water treatment system 11/29. Reclaimed water treatment system 11/29 is configured to have two outlets. Wherein, one of the outlets is connected with the inlet of shallow geothermal energy exchange system 14/21 corresponding to energy station 13/22, and the outlet of shallow geothermal energy system 14/21 is connect to a first inlet B'/E' of distribution pool 4/43 through outlet pipe of shallow geothermal energy exchange system 12/20. The other outlet of reclaimed water treatment system 11/29 is connected by a circulating water pump 16/24 with the inlet of a shallow geothermal energy exchange system 17/25 with different type from shallow geothermal energy system 14/21, and the outlet of shallow geothermal energy exchange system 17/25 is connected with a second inlet B"/E" of distribution pool 4/43 by an outlet pipe 18/26 and the reclaimed water retreatment system 156/157 installed thereon.

Inlet A of water supply main pipe 3 is connected with a water supply pump for water supply main pipe at the reclaimed water outlet of sewage treatment system 1. Outlet B of water supply main pipe 3 is connected with an inlet of distribution pool 4 of first energy station 13. Water supply pump 5 of water supply main pipe which is mounted at outlet C' of distribution pool 4 in first energy station 13 is connected with inlet C of the next section of water supply main pipe 3. Outlet E of the next section of water supply main pipe 3 is connected with inlet of distribution pool 43 in second energy station 11. Water supply pump 43 installed at the outlet of distribution pool 43 of second energy station 11 is connected with an inlet E of the next section of water supply main pipe 3, and so on until the last energy station.

Water return main pipe 19 is arranged between collection pools 8 and 34 of adjacent energy stations 13/22, which is configured to transport water by pressure and in both directions. Return connector a of collection pool 8 of the previous energy station is connected with head port b of water return main pipe 19 through return water pump for water return main pipe 10 and control valve for water return main pipe 9 in sequence. Tail port c of water return main pipe 19 is connected with first return connector d of collection pool 34 of the next energy station through control valve for water return main pipe 31 and return water pump for water return main pipe 30 in sequence. Second return connector d of collection pool 34 is connected with head port f of the next section of water return main pipe 19 through return water pump for water return main pipe 28 and control valve for water return main pipe 27 in sequence, and so on until the last energy station. In addition, head port b/f and tail port c of each water return main pipe 19 are connected with corresponding collection pool 8/34 respectively by bypass valves 7/36/33 and bypass pipe 6/35/32.

The distribution side of distribution pool 4/43 of each energy station 13/22 is connected with corresponding distribution pipe network 61/44. The outlet C"/F" at the distribution side of distribution pool 4/43 of each energy station 13/22 is connected with water supply branch pipe 62/51 of corresponding distribution pipe network 61/44 through distribution water pump 59/46 and water supply distribution pipe 60/47 in sequence. The inlet a'/d' of the collection pool 8/34 of the energy station 13/22 is connected with the distribution pipe network water return branch pipe 58/45 for source side water of the corresponding distribution pipe network 61/44, which is a hybrid pipe network with both ring-shape network and branched network. The source side water return pipelines of distribution pipe network 61/44 transport the return water by gravity force, pressure force or the combination of both.

Wherein, the water supply branch pipe 62/51 and water return branch pipe 58/45 of distribution pipe network 61/44 are connected with one or more user side water supply systems respectively.

Transmission and distribution stations are arranged in accordance with the layout of pipe network and the load demand at user side. The transmission and distribution stations is the distribution element in the pipe networks, which distribute the transmission medium in the pipe network (i.e. the source side water and reclaimed water) to each user terminal effectively, safely, reasonably and constantly, in accordance with the load demand, load variation of the source side water and reclaimed water in the service region.

Water supply main pipe 3 is connected with a plurality of transmission and distribution stations 38. The distribution side of each transmission and distribution stations 38 is connected with distribution pipe network 56. Transmission and distribution station 38 comprises distribution pool 39, distribution water pump 53 and control valve 41. Inlet pipe 40 of distribution pool 39 of transmission and distribution station is connected with water supply main pipe 3 at point D by control valve 41 so that it may receive the source side water and reclaimed water. Outlet D' at the distribution side of distribution pool 39 is connected with water supply branch pipe 57 of the corresponding distribution pipe network 56 through distribution water pump 53 and water supply distribution pipe 54 in sequence. Water return branch pipe 52 of distribution pipe network 56 is connected with water return distribution pipe 49/48 of distribution pipe network 44 corresponding to energy station 11 which is adjacent to distribution pipe network 56 by a water return distribution pipe 50. Water return distribution pipe 48 of distribution pipe network is connected with inlet d' of corresponding collection pool 34 by a booster pump for water return pipeline 37.

Wherein, water supply branch pipe 57 and water return branch pipe 52 of distribution pipe network 56 are connected with one or more user side water supply systems respectively.

As the expansion of the scope of the source side water supply and reclaimed water supply, it is necessary to set up sub-district district public water supply pipe network system compatible for source side water for ground source heat pump system and reclaimed water in the district far away from where the water supply main pipe is located.

Figure 2:
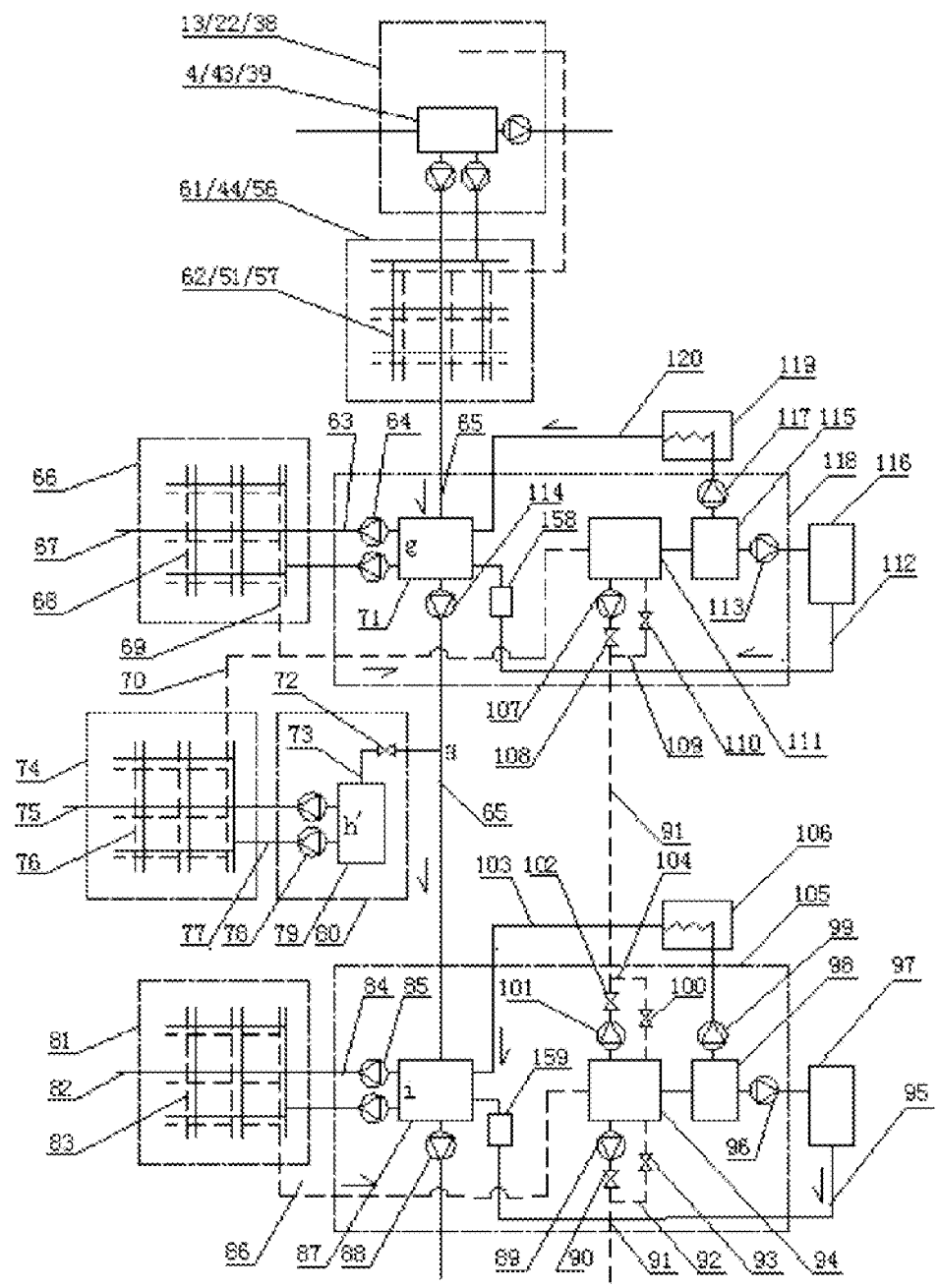
FIG. 2 is a diagram of the sub-district system of the second embodiment of the compatible pipe network system of the present invention.

As shown in FIG. 2, one of water supply branch pipes 62/51/57 of distribution pipe network 61/44/56 is connected with the energy station 13/22 or transmission or distribution station 38 is used as water supply main pipe 65 of sub-district pipe network in the district public water supply pipe network system compatible for source side water for ground source heat pump system and reclaimed water. The water supply main pipe 65 of sub-district pipe network is connected with a plurality of energy stations 118/105 of sub-district pipe network. Between the collection pools 111 and 94 of adjacent two energy stations 118/105 of sub-district pipe network, there are water return main pipes 91 of the sub-district pipe network connecting both collection pools 111/94. Return water pumps 107/101/89, control valves 108/102/90, bypass pipe 109/104/92, bypass valves 110/100/93 for water return main pipe are arranged at both the head port and tail port of water return main pipe 91 of the sub-district pipe network. Each energy station 118/105 of sub-district pipe network comprises a plurality of shallow geothermal energy exchange system of sub-district pipe networks which exchange heat with shallow geothermal source. Particularly, the outlet of collection pool 111/94 of each energy station 118/105 of the sub-district pipe network is connected with the inlet of reclaimed water treatment equipment 115/98 of the sub-district pipe network by pipelines. The outlet of reclaimed water treatment equipment 115/98 of the sub-district pipe network is connected with inlets of a plurality of shallow geothermal energy exchange system of sub-district pipe networks 119/116/106/97 respectively by circulating water pump 117/113/99/96 of shallow geothermal energy exchange system of sub-district pipe network. The outlets of shallow geothermal energy exchange system of sub-district pipe networks 119/106 are connected with distribution pool 71/87 of energy station 118/105 of the sub-district pipe network by outlet pipes 120/103 of the energy exchange system respectively. The outlets of shallow geothermal energy exchange system of sub-district pipe networks 116/97 are connected with distribution pool 71/87 of energy station 118/105 of the sub-district pipe network respectively by outlet pipes 112/95 of the energy exchange system and reclaimed water retreatment system 158/159 mounted thereon. Each energy station 118/105 of sub-district pipe network is connected with corresponding sub-district distribution pipe network 66/81. Particularly, outlet g/i at the distribution side of distribution pool 71/87 of each energy station 118/105 of sub-district pipe network is connected with water supply branch pipe 67/82 of corresponding sub-district distribution pipe network 66/81 through distribution water pump 64/85 and water supply distribution pipe 63/84 of sub-district distribution pipe network in sequence. The energy station collection pool 111/94 of each energy station 118/105 of sub-district pipe network is connected with water return branch pipe 68/83 of corresponding sub-district distribution pipe network 66/81 by water return distribution pipe 69/86 of sub-district distribution pipe network. Wherein, both the water supply branch pipe 67/82 and water return branch pipe 68/83 of distribution pipe network 66/81 are connected with one or more user side water supply systems respectively.

Water supply main pipe 65 of sub-district pipe network is also connected with a plurality of sub-district transmission and distribution station 80. The distribution side of each sub-district transmission and distribution station 80 is connected with sub-district distribution pipe network 74. Sub-district transmission and distribution station 80 comprises distribution pool 79, a distribution water pump 78 and control valve 72. Inlet pipe 73 of distribution pool 79 is connected with water supply main pipe of sub-district pipe network 65 at point H by control valve 72 of sub-district transmission and distribution station to receive the source side water and reclaimed water. Outlet h' at the distribution side of distribution pool 79 is connected with the water supply branch pipe 75 of the corresponding sub-district distribution pipe network 75 through distribution water pump 78 and water supply distribution pipe 77 of sub-district distribution pipe network. Water return branch pipe 76 of distribution pipe network 74 connected with sub-district transmission and distribution station 80 is connected with a water return distribution pipe 69 of sub-district distribution pipe network 66 connected with energy station 118 of the sub-district distribution pipe network which is adjacent to sub-district distribution pipe network 74 by water return distribution pipe 70. Wherein, water supply branch pipe 75 and water return branch pipe 76 of distribution pipe network 74 are connected with one or more user side water supply systems respectively.

Figure 3:
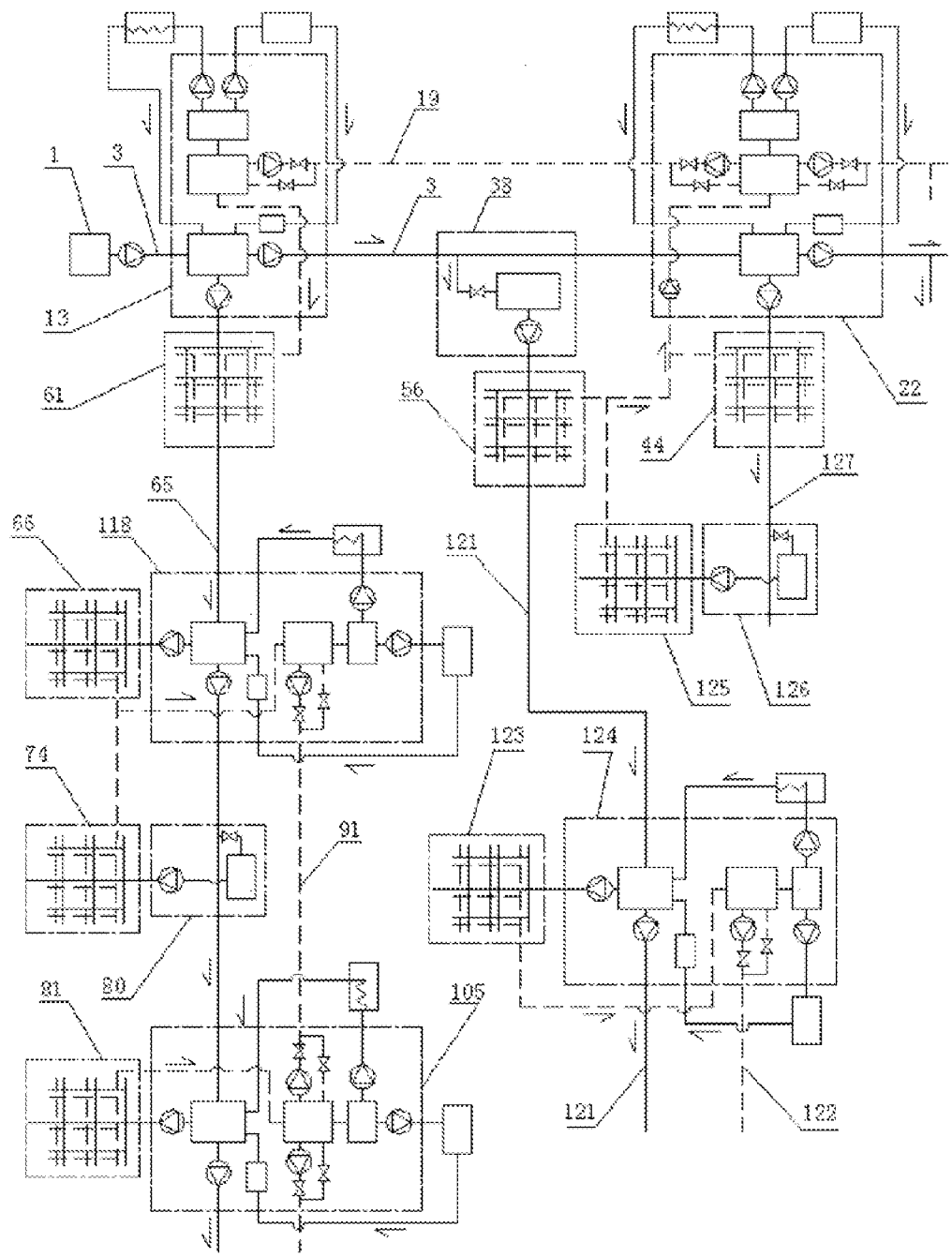
FIG. 3 is a diagram of the whole system of the third embodiment of the compatible pipe network system of the present invention.

As shown in FIG. 3, a plurality of energy stations 13/22, energy station of the sub-district pipe networks 105/118/124, transmission and distribution stations 38, and sub-district transmission and distribution stations 80/126 are connected with each other and extend in a hybrid topology structure of the combination of tree topology, star topology and bus topology, so that the district public water supply pipe network system compatible for source side water for ground source heat pump system and reclaimed water could be constructed.

The system according to the present invention operates in accordance with the following principles:

During operation, the recycled water from sewage treatment system 1, i.e. the source side water and reclaimed water is pressurized by pump 2 and transported to distribution pool 4 of first energy station 13 through water supply main pipe 3. Meanwhile, the cooling/heat medium water collected by shallow geothermal energy exchange system 14/17 in the district is transported to distribution pool 4 of first energy station 13. After mixture, a part of the source side water and reclaimed water is transported to distribution pipe network 61 by distribution water pump 59 mounted at outlet C" of distribution pool 4. The other part is pressurized by the water supply pump 5 for the water supply main pipe 3 and transported to transmission and distribution station 38.

In accordance with the load demand for the source side water and reclaimed water in the service district of transmission and distribution station 38, a part of the source side water and reclaimed water is transported to distribution pool 39 of transmission and distribution station 38 from point D of water supply main pipe 3 and through inlet pipe 40 of the transmission and distribution station. The source side water and reclaimed water input is transported to distribution pipe network 56 by distribution water pump 53 at distribution side D' of distribution pool 39. The other part of the source side water and reclaimed water in water supply main pipe 3 is transported to distribution pool 39 of second energy station 11 through water supply main pipe 3. Second energy station 11 adopts the same operation manner with that of first energy station 13, in which the cooling/heat medium water collected by shallow geothermal energy exchange system 21/25 in the district is transported to distribution pool 43 of second energy station 11. After mixture, a part of the source side water and reclaimed water is transported to distribution pipe network 44 by distribution water pump 46 mounted at distribution side F" of energy station distribution pool 43. The other part is pressurized by water supply pump 5 for water supply main pipe at point F of water supply main pipe 3 and transported to the distribution pool of next transmission and distribution station or energy station, and so on.

Water return branch pipe 58/45/52 of distribution pipe network 61/44/56 is configured to transport the source side water which has circulated in the water source heat pump units of the user terminal in the district back to collection pool 8/34 of energy station 13/22 through water return distribution pipe 55/49/48/50. The source side water is treated by reclaimed water treatment system 11/29 in the energy station, and then transported to respective shallow geothermal energy exchange system 14/21, 17/25 to exchange heat. The refreshed source side water obtained after the heat exchange is transported back to distribution pool 4/43 to circulate.

The sub-district pipe network operates according to the same principle.

At the user side of the district public water supply pipe network system compatible for the source side water for ground source heat pump system and reclaimed water, a water supply system may be established. According to the principle that water is used as source side water prior to as reclaimed water, the user side water supply system could not only make full use of the energy contained in the transmission medium (source side water and reclaimed water) in the district public water supply pipe network system compatible for the source side water for ground source heat pump system and reclaimed water to provide cooling/heat source for any district user's water source heat pump units, but also participate in the thermal cycle, in which the source side water after energy exchange could be used as the users' reclaimed water source, as non-potable water, for miscellaneous purposes.

Particularly, there are three forms of the user side water supply system for the district public water supply pipe network system compatible for the source side water for ground source heat pump system and reclaimed water. The first form: the user side water supply system provides source side water and reclaimed water to users who use centralized ground source heat pump HVAC system. The second form: the user side water supply system provides source side water and reclaimed water to the users who use distributed ground source heat pump HVAC system. The third form: the user side water supply system provides source side water and reclaimed water to the users who only use reclaimed water and do not use ground source heat pump HVAC system.

Figure 4:
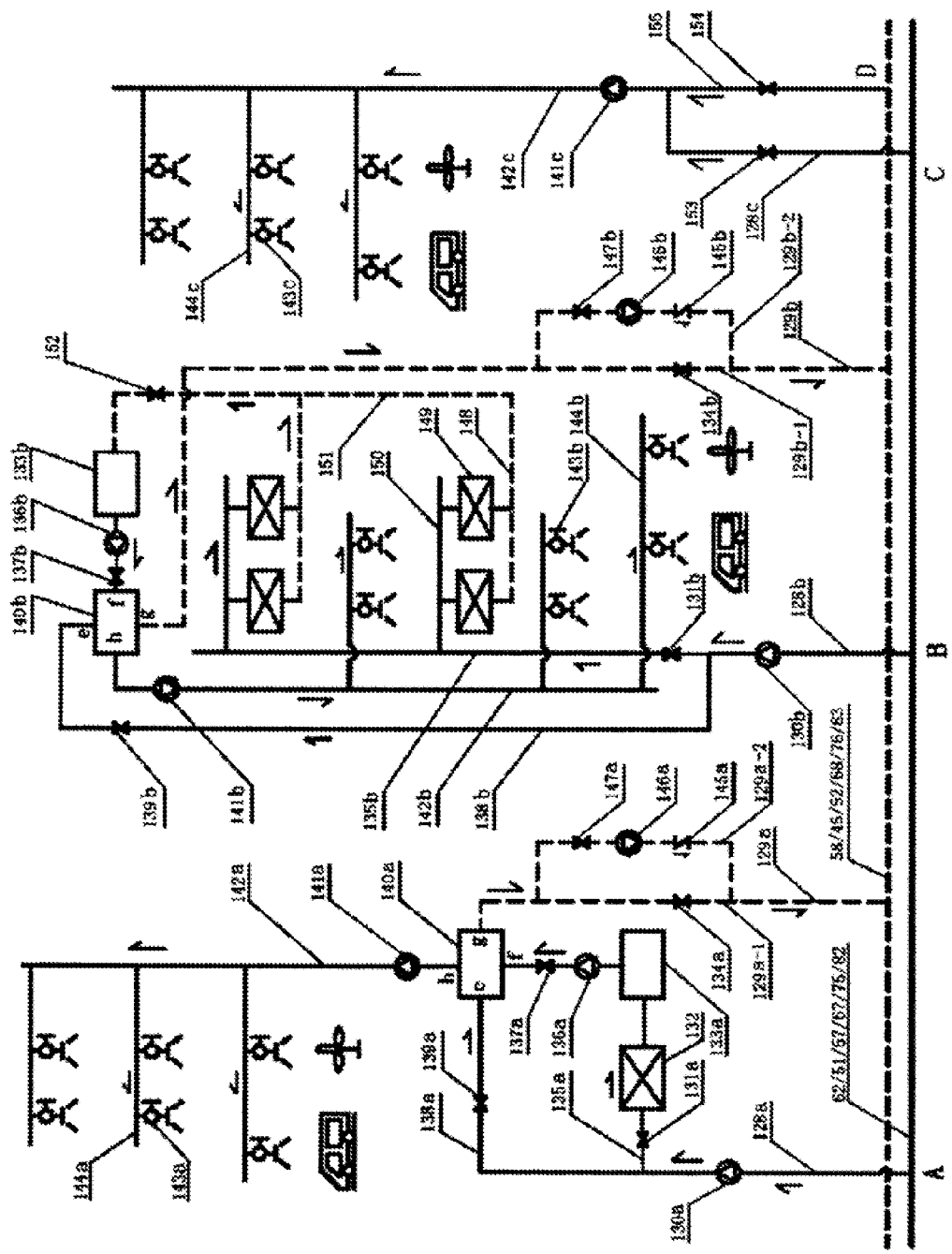
FIG. 4 is a diagram of the user side water supply system.

As shown in FIG. 4, the user side water supply system of the district public water supply pipe network system compatible for the source side water for ground source heat pump system and reclaimed water, comprises water supply branch pipe 62/51/57/67/75/82, water return branch pipe 58/45/52/68/76/83, on which the first form of user side water supply system with the centralized ground source heat pump HVAC system, the second form of user side water supply system with the distributed ground source heat pump HVAC system, and the third form of user side water supply system with the reclaimed water only are respectively installed. Wherein, each of water supply branch pipe 62/51/57/67/75/82 is respectively connected with first water supply sub-branch pipe 128a of the first user side water supply system through first water supply port A which supplies the source side water and reclaimed water to the first user side water supply system, with second water supply sub-branch pipe 128b of the second user side water supply system through second water supply port B which supplies the source side water and reclaimed water to the second user side water supply system, with third water supply sub-branch pipe 128c of the third user side water supply system through second water supply port C which supplies the source side water and reclaimed water to the second user side water supply system. Water return branch pipe 3 is connect with fourth water supply sub-pipe 155 of the third user side water supply system through the fourth water supply port D to receive source side back water.

On water return branch pipe 58/45/52/68/76/83, a first return port a is connected with the first water return sub-branch pipe 129a of the first user side water supply system, and a second return port b is connected with second water return sub-branch pipe 129b connected with the second user side water supply system are installed.

Wherein, the first user side water supply system comprises first booster water supply pump 130a connected with first water supply sub-branch pipe 128a, the outlets of which are respectively connected with first source side water inlet sub-branch pipe 135a and first reclaimed water sub-branch pipe 138a. The outlet of first source side water inlet sub-branch pipe 135a is connected with the inlet of centralized water source heat pump units 132, the outlet of which is connected with the inlet of first reclaimed water treatment equipment 133a. The outlet of first reclaimed water treatment equipment 133a is connected with first inlet f of first reclaimed water tank 140a through first source side water outlet water pump 136a.

Return port g of first reclaimed water tank 140a is connected with water return branch pipe 58/45/52/68/76/83 of the distribution pipe network through a first source side water return pipe 129a and a first source side water return element connected thereon. The first source side water return element comprises first gravity return pipe 129a-1 and first pressure return pipe 129a-2, which are parallel to each other and both connected with first water return sub-branch pipe 129*a*. The terminal outlet of first water return sub-branch pipe 129*a* is connected with water return branch pipe of distribution pipe network 58/45/52/68/76/83.

Fourth control valve 134*a* is installed on first gravity return pipe 129*a*-1, and fifth control valve 147*a*, first return water pump 146*a* and first return check valve 145*a* are installed on first pressure return pipe 129*a*-2 in sequence along the flow direction. When operating in pressure return mode, return port g of first reclaimed water tank 140*a* is connected with the water return branch pipe of distribution pipe network 58/45/52/68/76/83 through first water return sub-branch pipe 129*a*, first pump 146*a* and first return check valve 145*a* both installed on first pressure return pipe 129*a*-2 in sequence. When operating in gravity return mode, return port g of first reclaimed water tank 140*a* is connected with water return branch pipe of the distribution pipe network 58/45/52/68/76/83 through first water return sub-branch pipe 129*a* and first gravity return pipe 129*a*-1.

The outlet of first reclaimed water sub-branch pipe 138*a* is connected with second inlet e of first reclaimed water tank 140*a*. Outlet h of first reclaimed water tank 140*a* is connected with first reclaimed water supply element through first reclaimed water distribution pipe 142*a* and first reclaimed water pump 141*a* installed thereon.

The first reclaimed water supply element comprises one or more outlets on first reclaimed water distribution pipe 142*a* and reclaimed water branch pipe for first user side water supply system 144*a* connected with each outlet of the first reclaimed water distribution pipe 142*a*. One or more first reclaimed water user terminals 143*a* are installed on each reclaimed water branch pipe for first user side water supply system 144*a*.

Wherein, first control valve 131*a* is installed on first source side water inlet sub-branch pipe 135*a*. Second control valve 139*a* is installed on the first reclaimed water sub-branch pipe 138*a*. Third control valve 137*a* is installed on the pipeline connecting first source side outlet water sub-branch pipe 136*a* and first reclaimed water tank 140*a*.

The second user side water supply system comprises a second booster water supply pump 130*b* connected with second water supply sub-branch pipe 128*b*, the outlet of which is respectively connected with second source side water inlet sub-branch pipe 135*b* and second reclaimed water sub-branch pipe 138*b*. There are one or more outlets on second source side water inlet sub-branch pipe 135*b*. Each outlet is connected with source side water inlet pipe 150. Each source side water inlet pipe 150 is connected with one or more inlets of distributed water source heat pump units 149. The outlet of each distributed water source heat pump units 149 is connected with the inlet of corresponding source side water outlet pipe 148. The outlets of a plurality of source side water outlet pipes 148 is connected with the inlet of source side water outlet header pipe 151. The outlet of source side water outlet header pipe 151 is connected with the inlet of second reclaimed water treatment equipment 133*b*. The outlet of second reclaimed water treatment equipment 133*b* is connected with first inlet f of second reclaimed water tank 140*b* through a second source side water outlet pump 136*b*.

Return port g of second reclaimed water tank 140*b* is connected with water return branch pipe 58/45/52/68/76/83 of the distribution pipe network through second water return sub-branch pipe 129*b* and second return element connected thereon. The second return element comprises second gravity return pipe 129*b*-1 and second pressure return pipe 129*b*-2, which are parallel to each other and both connected with second water return sub-branch pipe 129*b*. The terminal outlet of second water return sub-branch pipe 129*b* is connected with water return branch pipe of sub-district distribution pipe network 58/45/52/68/76/83. Wherein, tenth control valve 134*b* is installed on second gravity return pipe 129*b*-1.

Eleventh control valve 147*b*, second return water pump 146*b* and second check valve 145*b* are installed on second pressure return pipe 129*b*-2 in sequence along the flow direction. When operating in pressure return mode, return port g of second reclaimed water tank 140*b* is connected with water return branch pipe of distribution pipe network 58/45/52/68/76/83 through second water return sub-branch pipe 129*b* and second return water pump 146*b* and second return check valve 145*b* both installed thereon in sequence. When operating in gravity return mode, return port g of second reclaimed water tank 140*b* is connected with water return branch pipe of distribution pipe network 58/45/52/68/76/83 through second pipe 129*b* and second gravity return pipe 129*b*-1.

The outlet of second reclaimed water sub-branch pipe 138*b* is connected with second inlet e of second reclaimed water tank 140*b*. Outlet h of second reclaimed water tank 140*b* is connected with a second reclaimed water supply element through second reclaimed water distribution pipe 142*b* and second reclaimed water pump 141*b* installed thereon.

The second reclaimed water supply element comprises one or more outlets on second reclaimed water distribution pipe 142*b* and reclaimed water branch pipe for second user side water supply system 144*b* connected with each outlet of reclaimed water branch pipe for second user side water supply system 142*b* respectively. One or more second reclaimed water user terminals 143*b* are installed on each reclaimed water branch pipe for second user side water supply system 144*b*.

Wherein, sixth control valve 131*b* is installed on second source side water inlet sub-branch pipe 135*b*. Seventh control valve 139*b* is installed on second reclaimed water sub-branch pipe 138*b*. Eighth control valve 137*b* is installed on the pipeline connecting second source side water inlet sub-branch pipe 136*b* and second reclaimed water tank 140*a*. The outlet of source side water outlet header pipe 151 is connected with the inlet of second reclaimed water treatment equipment 133*b* through ninth control valve 152.

In the user side water supply system of the district public water supply pipe network system compatible for the source side water for ground source heat pump system and reclaimed water according to the present invention, the first reclaimed water tank 140*a* and the second reclaimed water tank 140*b* may get the water return in gravity return mode or in pressure return mode. The mode adopted to get the water return is depended on the pressure in water return branch pipe of distribution pipe networks 58/45/52/68/76/83, first reclaimed water tank 140*a* and second reclaimed water tank 140*b*.

The third user side water supply system comprises third water supply sub-branch pipe 128*c* and twelfth control valve 153 installed thereon, and fourth water supply sub-branch pipe 155 and thirteenth control valve 154 installed thereon. The outlets of third water supply sub-branch pipe 128*c* and that of fourth water supply sub-branch pipe 155 are both connected with a third reclaimed water supply element together through third reclaimed water distribution pipe 142*c* and third reclaimed water pump 141*c* installed thereon.

The third reclaimed water supply element comprises one or more outlets on third reclaimed water distribution pipe 142c and reclaimed water branch pipe for third user side water supply system 144c respectively connected with each outlet of the third reclaimed water distribution pipe 142c. One or more third reclaimed water user terminals 143c are installed on each reclaimed water branch pipe for third user side water supply system 144c.

The original reclaimed water supply pipe in the urban public reclaimed water pipe network in prior art may be used as water supply branch pipe of distribution pipe network 62/51/57/67/75/82 of the present invention. At the same time, the water return branch pipe of the distribution pipe network 58/45/52/68/76/83 of the district public water supply pipe network system compatible for the source side water for ground source heat pump system and reclaimed water need adopts the secondary reclaimed water supply pipe specifically built for the system.

The operation principle of the user side water supply system of the water supply pipe network is as follows:

the first user side water supply system: During the operation of centralized water source heat pump units 132, second control valve 139a installed on first reclaimed water sub-branch pipe 138a is shut down, and first control valve 131a installed on first source side water inlet sub-branch pipe 135a and third control valve 137a installed on pipeline connecting first source side water outlet pump 136a and first reclaimed water tank 140a are opened. First water supply sub-branch pipe 128a receives the source side water and reclaimed water from first water supply port A of water supply branch pipe of the distribution pipe network 62/51/57/67/75/82 of the district public water supply pipe network system compatible for the source side water for ground source heat pump system and reclaimed water. The received source side water and reclaimed water is pressurized by first booster water supply pump 130a and transported to centralized water source heat pump units 132 through first source side water inlet sub-branch pipe 135a to participating into the thermal cycle for cooling or heating. The source side backwater which has passed through the thermal cycle is input into the first reclaimed water treatment equipment 133a to be treated into reclaimed water satisfying the standard, which is then transported to the first reclaimed water tank 140a through first source side outlet water pump 136a and the third control valve 137a in sequence. First reclaimed water pump 141a on first reclaimed water sub-branch pipe 142a pumps the source side water in the first reclaimed water tank 140a to each first reclaimed water user terminal 143a through first reclaimed water distribution pipe 142a and reclaimed water branch pipe for first user side water supply system 144a. The other part of the source side water in first reclaimed water tank 140a is transported back to water return branch pipe of distribution pipe network 58/45/52/68/76/83 of the district public water supply pipe network system compatible for the source side water for ground source heat pump system and reclaimed water by means of gravity return or pressure return.

During centralized water source heat pump units 132 are out of service, first control valve 131a installed on first source side water inlet sub-branch pipe 135a and third control valve 137a installed on the pipeline connecting first heat source outlet pump 136a and first reclaimed water tank 140a are shut down, and second control valve 139a installed on first reclaimed water sub-branch pipe 138a is opened. First water supply sub-branch pipe 128a receives the source side water and reclaimed water from first water supply port A of water supply branch pipe of the distribution pipe network 62/51/57/67/75/82 of the district public water supply pipe network system compatible for the source side water for ground source heat pump system and reclaimed water. The received source side water and reclaimed water is pressurized by the first booster water supply pump 130a and transported to first reclaimed water tank 140a through first reclaimed water sub-branch pipe 138a only as the reclaimed water. First reclaimed water pump 141a pumps the reclaimed water in first reclaimed water tank 140a to each first reclaimed water user terminal 143a through first reclaimed water distribution pipe 142a and reclaimed water branch pipe for first user side water supply system 144a.

B. the second user side water supply system: During the operation of distributed water source heat pump units 149, seventh control valve 139b installed on second reclaimed water sub-branch pipe 138b is shut down, and sixth control valve 131b installed on source side water inlet sub-branch pipe 135b and eighth control valve 137b installed on the pipeline connecting second source side water outlet pump 136b and second reclaimed water tank 140b are opened. Second water supply sub-branch pipe 128b receives the source side water and reclaimed water from second water supply port B of the water supply branch pipe of distribution pipe network 62/51/57/67/75/82 of the district public water supply pipe network system compatible for the source side water for ground source heat pump system and reclaimed water. The received source side water and reclaimed water is pressurized by second booster water supply pump 130b and transported to the distributed water source heat pump units 149 at the user end through second source side water inlet sub-branch pipe 135b and source side water inlet pipe 150 to participating in the thermal cycle for cooling or heating. The source side water which is returned from the thermal cycle is input into second reclaimed water treatment equipment 133b through source side water outlet pipe, source side water outlet header pipe 151 and ninth control valve 152 to be treated into reclaimed water satisfying the standard, which is then transported to second reclaimed water tank 140b through second source side water outlet pump 136b and eight control valve 137b installed on the pipeline connecting second source side water outlet pump 136b and second reclaimed water tank 140b in sequence. Second reclaimed water pump 141b installed on second reclaimed water sub-branch pipe 142b pumps source side water in second reclaimed water 140b to each second reclaimed water user terminal 143b through second reclaimed water distribution pipe 142b and reclaimed water branch pipe for second user side water supply system 144b. The other part of the source side water in second reclaimed water tank 140b is transported back to water return branch pipe of the distribution pipe network 58/45/52/68/76/83 of the district public water supply pipe network system compatible for the source side water for ground source heat pump system and reclaimed water by means of pressure return or gravity return.

During distributed water source heat pump units 149 are out of service, sixth control valve 131b installed on second source side water inlet sub-branch pipe 135b and eighth control valve 137b installed on the pipeline connecting the second source side water outlet pump 136b and second reclaimed water tank 140b are shut down, and seventh control valve 139b installed on second reclaimed water sub-branch pipe 138b is opened. Second water supply sub-branch pipe 128b receives the source side water and reclaimed water from second water supply port B of water supply branch pipe of the distribution pipe network 62/51/57/67/75/82 of the district public water supply pipe network system compatible for the source side water for ground source heat pump system and reclaimed water. The received source side water and reclaimed water is pressurized by the second booster water supply pump 130b and transported to second reclaimed water tank 140a through second reclaimed water sub-branch pipe 138b only as the reclaimed water. Second reclaimed water pump 141b pumps the reclaimed water in second reclaimed water tank 140b to each second reclaimed water user terminal 143b through second reclaimed water distribution pipe 142b and the reclaimed water branch pipe for third user side water supply system 144b.

C. the third user side water supply system: when the above-mentioned two kinds of user side water supply system start centralized water source heat pump units 132 and distributed water source heat pump units 149 in the ground source heat pump HVAC system respectively, twelfth control valve 163 installed on third water supply sub-branch pipe 128c is shut down, and thirteenth control valve 154 installed on fourth water supply sub-branch pipe 155 is opened. Fourth water supply sub-branch pipe 155 receives the source side water which is the secondary reclaimed water with no energy to extract from fourth water supply port D of water return branch pipe of the distribution pipe network 58/45/52/68/76/83 of the district public water supply pipe network system compatible for the source side water for ground source heat pump system and reclaimed water. The received source side water is transported to third reclaimed water supply equipment in the third user side water supply system by third reclaimed water pump 141c installed on third reclaimed water distribution 142c.

When the above-mentioned two kinds of user side water supply system shut down centralized water source heat pump units 132 and distributed water source heat pump units 149 in the ground source heat pump HVAC system respectively, thirteenth control valve 153 is shut down, twelfth control valve 163 is opened. Third water supply sub-branch pipe 128c receives the source side water and reclaimed water from third water supply port C of water supply branch pipe of distribution pipe network 62/51/57/67/75/82 of the district public water supply pipe network system compatible for the source side water for ground source heat pump system and reclaimed water. The received source side water and reclaimed water is transported to the third reclaimed water supply equipment in the third user side water supply system by third reclaimed water pump 141c installed on third reclaimed water distribution pipe 142c as reclaimed water only.

In the user side water supply system of the district public water supply pipe network system compatible for the source side water for ground source heat pump system and reclaimed water according to the present invention, the original reclaimed water supply pipe in the urban public reclaimed water pipe network in prior art may be used as water supply branch pipe of distribution pipe network 62/51/57/67/75/82 of the present invention. At the same time, water return branch pipe of distribution pipe network 58/45/52/68/76/83 of the district public water supply pipe network system compatible for the source side water for ground source heat pump system and reclaimed water may adopts the secondary reclaimed water supply pipe which is not disclosed in prior art.

I claim:

1. A water supply pipe network system, comprising:
  a water supply main pipe;
  a shallow geothermal energy exchange system; and
  an energy station configured to receive reclaimed water through the water supply main pipe and configured to receive source side water from the shallow geothermal energy exchange system;
  wherein the energy station is configured to generate mixed water by mixing the reclaimed water and the source side water and configured to provide the mixed water to a user side water supply system;
  wherein the energy station is configured to receive return water from the user side water supply system and configured to provide the return water to the shallow geothermal energy exchange system;
  wherein the shallow geothermal energy exchange system is configured to generate the source side water by exchanging heat between the return water and a geothermal energy source.

2. The water supply pipe network system of claim 1, wherein the energy station comprises:
  a distribution pool configured to contain the mixed water, wherein an inlet of the distribution pool is connected with the water supply main pipe and another inlet of the distribution pool is connected with the shallow geothermal energy exchange system; and
  a collection pool configured to contain the return water, wherein an outlet of the collection pool is connected with the shallow geothermal energy exchange system.

3. The water supply pipe network system of claim 2, wherein the energy station further comprises a reclaimed water treatment system connected between the collection pool and the shallow geothermal energy exchange system, and configured to process the return water from the collection pool and provide a processed water to the shallow geothermal energy exchange system.

4. The water supply pipe network system of claim 2, wherein the water supply main pipe serially connects distribution pools of a plurality of other energy stations.

5. The water supply pipe network system of claim 4, further comprising a transmission and distribution station configured to receive the mixed water from the energy station and configured to provide the mixed water to the user side water supply system.

6. The water supply pipe network system of claim 5, wherein the transmission and distribution station comprises a distribution pool serially connected to the distribution pools of the plurality of other energy stations through the water supply main pipe.

7. The water supply pipe network system of claim 5, further comprising a distribution pipe network, wherein the energy station or the transmission and distribution station is connected with a plurality of other user side water supply systems through the distribution pipe network, the distribution pipe network comprises a water supply distribution pipe and a water return distribution pipe, wherein the water supply distribution pipe is connected with a plurality of water supply branch pipes, each of which is configured to distribute the mixed water from the energy station or the transmission and distribution station to one of the plurality of other user side water supply systems, and the water return distribution pipe is connected with a plurality of water return branch pipes, each of which is configured to transport the return water from one of the plurality of other user side water supply systems back to the energy station.

8. The water supply pipe network system of claim 7, wherein the distribution pipe network is configured to transport the return water by means of gravity force or pressure force.

9. The water supply pipe network system of claim 7, further comprising a sub-district water supply pipe network, the sub-district water supply pipe network comprises:
- a sub-district water supply main pipe,
- a sub-district shallow geothermal energy exchange system, and
- a sub-district energy station configured to receive the mixed water from the energy station through the sub-district water supply main pipe and configured to receive a sub-district source side water from the sub-district shallow geothermal energy exchange system;
- wherein the sub-district energy station is configured to generate sub-district mixed water by mixing the mixed water and the sub-district source side water and configured to provide the sub-district mixed water to the user side water supply system.

10. The water supply pipe network system of claim 9, wherein the sub-district water supply main pipe is connected with one of the water supply branch pipes of the distribution pipe network and configured to transport the mixed water from the energy station to the sub-district energy station.

11. The water supply pipe network system of claim 9, wherein the sub-district energy station is configured to receive return water from the user side water supply system and configured to provide the return water to the sub-district shallow geothermal energy exchange system.

12. The water supply pipe network system of claim 9, wherein the sub-district water supply pipe network comprises a sub-district transmission and distribution station configured to receive the sub-district mixed water from the sub-district energy station, and configured to provide the sub-district mixed water to the user side water supply system.

13. The water supply pipe network system of claim 12, wherein the sub-district water supply pipe network comprises a sub-district distribution pipe network, the sub-district energy station or the sub-district transmission and distribution station is connected with the plurality of other user side water supply systems through the sub-district distribution pipe network, the sub-district distribution pipe network comprises a sub-district water supply distribution pipe and a sub-district water return distribution pipe, wherein the sub-district water supply distribution pipe is connected with a plurality of sub-district water supply branch pipes, each of which is configured to distribute the mixed water from the sub-district energy station or the sub-district transmission and distribution station to one of the plurality of other user side water supply systems, and the sub-district water return distribution pipe is connected with a plurality of sub-district water return branch pipes, each of which is configured to transport the return water from one of the plurality of other user side water supply systems back to the sub-district energy station.

14. The water supply pipe network system of claim 4, further comprising a water return main pipe serially connected with a plurality of collection pools of the plurality of other energy stations and configured to transport the return water among the plurality of collection pools of the plurality of other energy stations.

15. The water supply pipe network system of claim 2, wherein the shallow geothermal energy exchange system is a closed loop shallow geothermal energy exchange system.

16. The water supply pipe network system of claim 2, wherein the shallow geothermal energy exchange system is an open loop shallow geothermal energy exchange system, and wherein the energy station further comprises a reclaimed water retreatment system connected between the distribution pool and the shallow geothermal energy exchange system, and configured to process the source side water from the shallow geothermal energy exchange system and provide a processed water to the distribution pool.

17. The water supply pipe network system of claim 1, wherein the user side water supply system comprises one or more water source heat pump units and a reclaimed water tank, wherein the one or more water source heat pump units are configured to receive the mixed water provided to the user side water supply system and configured to make use of energy in the mixed water, and the reclaimed water tank is configured to contain the mixed water running out of the one or more water source heat pump units.

18. The water supply pipe network system of claim 17, wherein the user side water supply system comprises a source side water return pipe, which is configured to transport a part of water in the reclaimed water tank back to the energy station as the return water.

19. The water supply pipe network system of claim 18, wherein the reclaimed water tank is configured to directly receive the mixed water provided to the user side water supply system and configured to provide all water in the reclaimed water tank to reclaimed water user terminals, and the source side water return pipe is configured to stop transporting water in the reclaimed water tank back to the energy station.

20. The water supply pipe network system of claim 17, wherein the reclaimed water tank is configured to provide a part of water in the reclaimed water tank to a plurality of reclaimed water user terminals.

\* \* \* \* \*